United States Patent [19]

Asano

[11] Patent Number: 4,528,653

[45] Date of Patent: Jul. 9, 1985

[54] RECORD PLAYER WITH AUTOMATIC MUSIC SEARCH FUNCTION

[75] Inventor: Hisashi Asano, Kunitachi, Japan

[73] Assignee: Sony Corporation, Tokyo, Japan

[21] Appl. No.: 588,928

[22] Filed: Mar. 13, 1984

[30] Foreign Application Priority Data

Mar. 19, 1983 [JP] Japan .................................. 58-46874

[51] Int. Cl.³ ............................ G11B 3/38; G11B 7/00; G11B 17/06
[52] U.S. Cl. ....................................... 369/41; 369/33; 369/266
[58] Field of Search ................... 369/41, 33, 266, 215, 369/216

[56] References Cited

U.S. PATENT DOCUMENTS

| 4,094,013 | 6/1978 | Hill et al. | 369/41 |
| 4,278,923 | 7/1981 | Nowak et al. | 369/266 |
| 4,375,092 | 2/1983 | Yoshio | 369/41 |
| 4,398,278 | 8/1983 | Suzuki | 369/41 |
| 4,408,310 | 10/1983 | Watanabe | 369/41 |
| 4,443,869 | 4/1984 | Ammon | 369/41 |
| 4,471,476 | 9/1984 | Yoshio | 369/41 |
| 4,485,465 | 11/1984 | Kirschner | 369/77.2 |

FOREIGN PATENT DOCUMENTS

| 2064851 | 3/1979 | Fed. Rep. of Germany | 369/41 |
| 25815 | 2/1980 | Japan | 369/41 |

*Primary Examiner*—Steven L. Stephan
*Attorney, Agent, or Firm*—Lewis H. Eslinger; Alvin Sinderbrand

[57] ABSTRACT

A record player is equipped with a tonearm control which enables the record player to perform an automatic music search, that is, the pickup device of the tone arm may be automatically controlled to be set down at the beginning of a selected song. It may happen that the center of the record is slightly displaced from the center of the turntable, so that different angular segments of the recorded tracks lie at different radial distances from the turntable center. The present tonearm control compensates for this by detecting the radial and angular position of the beginning of the selected song and by setting down the pickup device at this position. The radial position of the beginning of each song is measured along a radial reference detection line while the turntable is at rest at an initial angular position. Then, while the turntable is rotating, the tone arm is moved across the record until the pickup device reaches the measured radial position of the beginning of the selected song. The angular position of the turntable relative to its initial position is detected, and the tone arm control determines the moment of set down so that the record rotates just enough to bring the reference detection line to the angular position of the pickup device. Therefore, the pickup device is set down at the angular position on the record at which the radial position of the beginning of the song was measured. The result is that play starts at the beginning of the song even when the eccentricity of the record causes the tracks to be off center.

11 Claims, 6 Drawing Figures

RECORD PLAYER WITH AUTOMATIC MUSIC SEARCH FUNCTION

BACKGROUND OF THE INVENTION

1. Field of the Invention

The present invention relates to record players of the type adapted to perform an automatic music search where blank or nonmusic portions between the songs on a record are preliminarily detected by detecting means, and the tone arm is set down in the blank portion at the beginning of a selected song.

2. Description of the Prior Art

A highly desirable feature to have in a record player is the automatic music search. Many records have several different songs recorded on each side, and a listener may want to skip the first few songs. Normally the tone arm is automatically set down in the blank portion preceding the first song, but to skip songs, the tone arm would have to be set down somewhere in the middle of the record. Of course, this can be done manually by setting the tone arm down at the start of the selected song, but an automatic means for doing this would be highly desirable, not only for accuracy, but also to avoid scratching the record. In an automatic music search (AMS), the tone arm is automatically controlled to be set down in the blank portion immediately preceding the start of whichever song is selected. To do this, however, the positions of the blank portions must be known.

One type of record player which can perform an AMS has a turntable base which can be slid in and out of a player cabinet. The turntable base is unloaded or slid out of the player cabinet in response to activation of a control button on the cabinet, so that a disk or record may be placed on the turntable. The turntable base is then loaded back inside the player cabinet, and the record is played while the turntable base is in the loaded position. The loading and unloading operations may both be performed automatically.

In this type of record player, the blank portions of the record which intervene between the several songs can be detected and their distances from the center of the turntable can be measured during the loading operation of the turntable base into the player cabinet. That is, as the turntable base is moved linearly into the player cabinet, the record passes underneath a detector, fixed to the cabinet, which detects each blank portion as it passes by. By knowing the relative positions of the turntable base and the cabinet at the time of detection, the radial distances of the blank portions can be calculated. When the turntable base is completely loaded, automatic music search can then be performed so that the stylus or pickup device is automatically set down on the record at the beginning of a desired song in accordance with the measured radial distances of the blank portions.

However, in this type of record player, the radial distances are measured while the turntable base is being loaded, that is, while the disk is not rotating. On the other hand, the automatic music search is performed while the disk is rotating, by moving the tone arm horizontally so as to dispose the pickup device above a position on the record which corresponds to one of the previously measured radial distances from the turntable center, and then lowering the stylus or pickup device, mounted at the distal end portion of the tone arm, onto the specified position.

Because the record is rotating, the stylus may be set down at any angular position on the record, and most likely this will not be the angular position at which the radial distances of the blank portions were measured. If the record were perfectly symmetrical and centered exactly around the spindle of the turntable, this difference in angular position would be irrelevant. However, if the record is slightly off-center, as when the record fits loosely around the spindle, or if the actual tracks on the record in which the songs are recorded are themselves eccentric, then different angular portions of the tracks, and the blank portions in between, will lie at slightly different radial distances from the center of the turntable. When this is so, the measured radial distances of the blank portions equal the actual radial distances only at the angular position at which the radial distances were measured, while at other angular positions the measured radial distances will be slightly smaller or larger than the actual radial distances. Even if the stylus is set down exactly at the measured radial distance, if it is landed at a random angular position, it may contact the record surface at a point already into the song, or even back into the preceding song. This is a highly undesirable result.

OBJECTS AND SUMMARY OF THE INVENTION

It is therefore an object of the present invention to provide a record player adapted to perform an automatic music search so that the stylus is set down at the correct blank position between songs even when the record is eccentric or fitted loosely around the turntable spindle.

In order to achieve the above and other objects of the present invention, there is provided a record player which is adapted to perform an automatic music search and which includes a tone arm actuating device and means for detecting the radially spaced blank portions between songs of a record placed on a turntable, comprising first detecting means for detecting radial positions of the portions of a record disk resting on the turntable along a radial detection line at a predetermined initial angular position of the turntable, second detecting means for detecting, as the record disk rotates, the angular positions of the detecting line relative to the initial angular position, and control means for controlling operation of the tonearm actuating device in response to the detected radial and angular positions such that the pickup device is set down on the one of the blank portions immediately in advance of the selected one of the recorded portions of the record disk at an angular position on the record disk substantially corresponding to the detection line.

The above, and other objects, features and advantages of the present invention will be apparent in the following detailed description which is to be read in conjunction with the attached drawings.

DETAILED DESCRIPTION OF A PREFERRED EMBODIMENT OF THE INVENTION

A record player according to the present invention, adapted to perform an automatic music search, will now be described with reference to the accompanying drawings, in which like elements are labeled with like numerals throughout.

Figure 1:
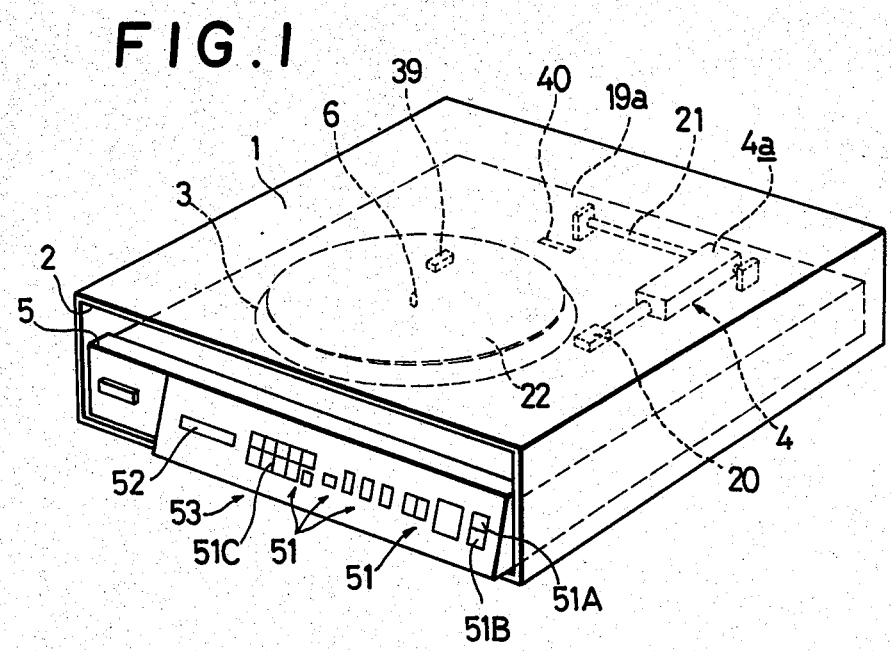
FIG. 1 is a perspective view of an embodiment of a record player according to the present invention adapted to perform an automatic music search, and showing the turntable base in its loaded position.
Figure 2:
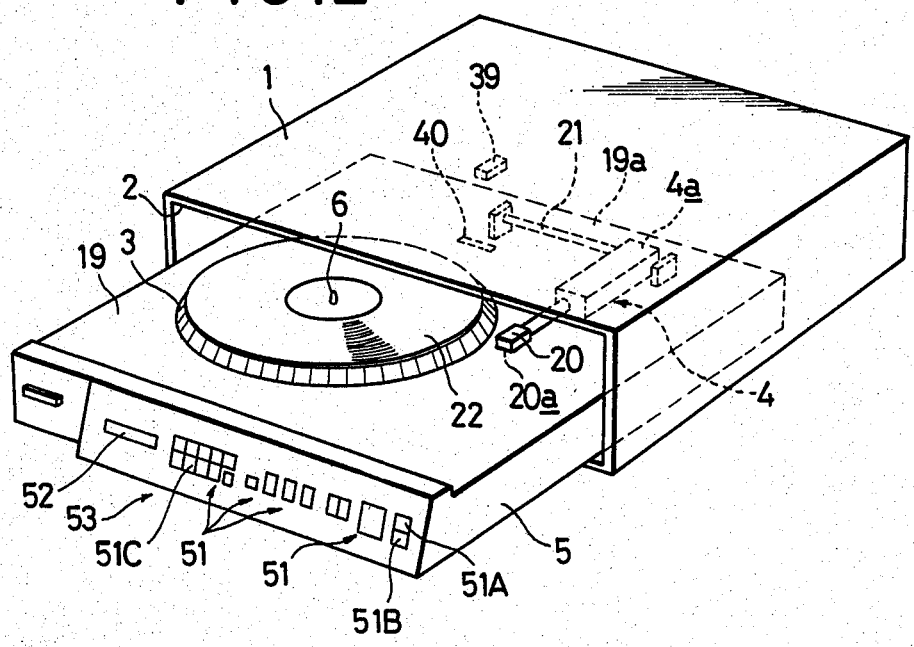
FIG. 2 is a perspective view of the record player of FIG. 1 with the turntable base in its unloaded position.

Referring initially to FIGS. 1 and 2, it will be seen that, in the record player embodying the present invention, as thus illustrated, a cabinet 1 houses a turntable base 5. FIG. 1 shows the turntable base 5 in its loaded position, when it is entirely within the player cabinet 1. FIG. 2 shows the turntable base 5 in its unloaded position, in which it extends horizontally partially out of a front opening 2 of cabinet 1. Mounted on the turntable base 5 is a rotatable turntable 3 and a tone arm 4. At the center of the turntable 3, a center spindle 6 extends upwardly for receiving the center hole of a record to be placed upon the turntable 3. As is shown in FIG. 2, when the turntable base is in its unloaded position, the center spindle 6 is outside of the cabinet 1 in front of the front opening 2, so that a record 22 may be easily placed on the turntable 3.

A front panel 53 is located at the front of the turntable base 5, and includes an operation section 51 having an unloading switch 51A, a loading switch 51B, and automatic music search program switches 51C. Front panel 53 also includes a display section 52, with display elements which may be liquid crystal display elements, for indicating the made of operation of the record player. The loading and unloading switches 51A and 51B are used to control the automatic loading and unloading operations, respectively, of the turntable base into and out of the player cabinet 1. Program switches 51C may be used to select the number of the desired song, thereby sending selection information to a control circuit of the record player. The operation of these switches will be discussed later in this description in connection with the description of the operation of the record player.

Figure 3:
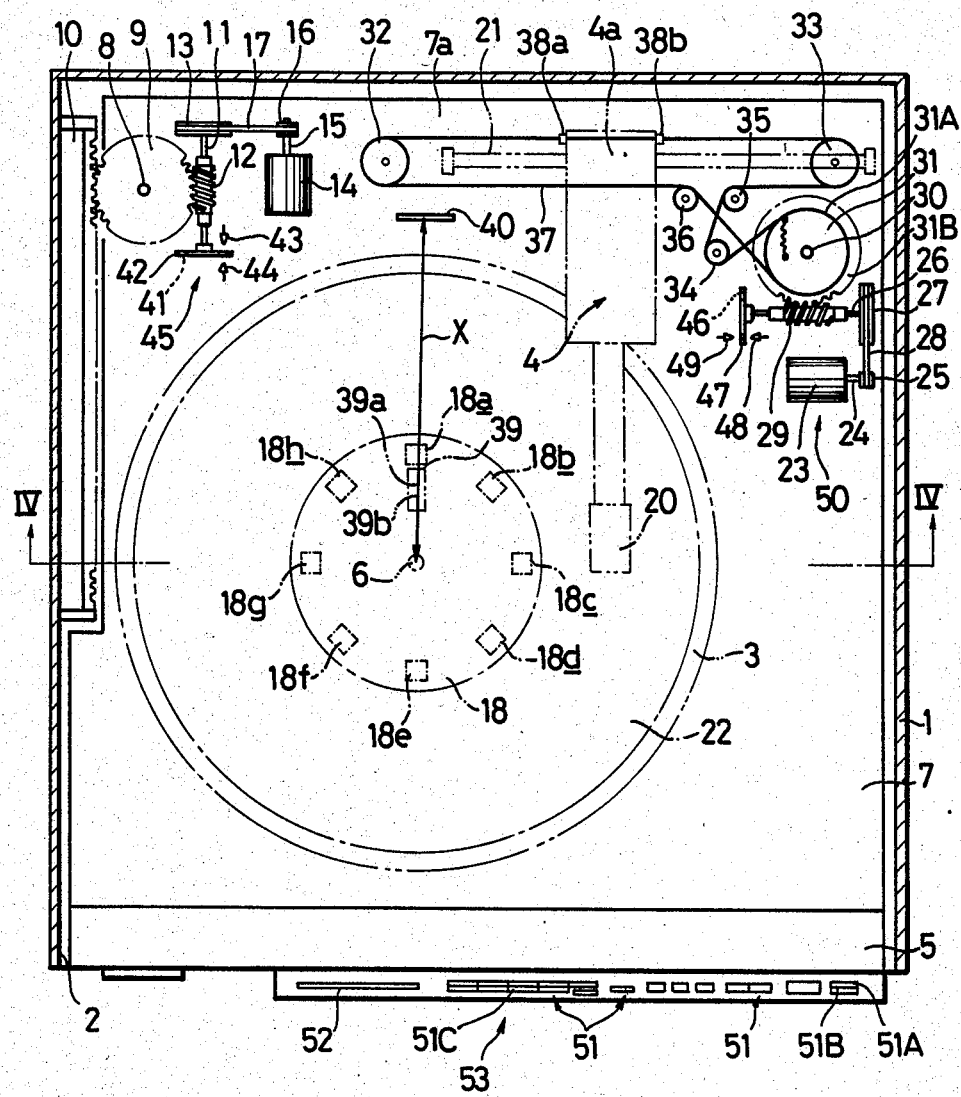
FIG. 3 is a schematic top plan view of the record player of FIG. 2, with its cabinet shown in section.

The structures provided for moving the turntable base 5 from its loaded position to its unloaded position and vice versa will now be described in connection with FIGS. 3 and 4. As may be seen in FIG. 3, a guide rack 10 is mounted on an inner surface of one side wall of the player cabinet 1, which in the embodiment of FIG. 3 is the left side wall of cabinet 1, to allow a horizontal movement of turntable base 5 outwardly through opening 2. Guide rack 10 has a length sufficient to provide a horizontal movement of turntable base 5 from its loaded position to its unloaded position. A chassis frame 7 constitutes a bottom portion of the turntable base 5, and a worm wheel 9 is rotatably mounted on a rear end portion 7a of chassis frame 7 by means of a shaft 8. A shaft 11 bears a worm 12, which rotates therewith, and has pulley 13 mounted at one end thereof. Guide rack 10 meshes with worm wheel 9, which in turn meshes with worm 12. A driving motor 14, mounted on the chassis frame 7, has a pulley 16 mounted on its driving shaft 15, and a belt 17 operatively couples pulley 13 and pulley 16. Therefore, upon forward or reverse rotation of the driving motor 14, pulley 16 is rotated in a forward or reverse direction, thereby causing rotation of pulley 13, shaft 11 and worm 12. As worm 12 rotates, worm wheel 9 is rotated thereby to drive turntable base 5 in the forward or reverse direction, that is, to move turntable base 5 from its loaded to its unloaded position, respectively, or vice versa. Suitable means, such as rollers are provided between the cabinet 1 and the turntable base 5 to provide smooth movement of the turntable base 5 with respect to cabinet 1 as turntable 5 moves between its loaded and unloaded positions.

An unloading end detection switch (not illustrated) is provided for detecting when the turntable base 5 has fully reached its unloaded position, and a corresponding loading end detection switch (not illustrated) is provided for detecting when the turntable base 5 has fully reached its loaded position within cabinet 1. These switches serve to turn driving motor 14 off when the turntable base has fully reached its unloaded or loaded position respectively. The loading end detection switch also provides a detection signal when the turntable base is fully loaded, and this detection signal is supplied to a microcomputer $\mu$-COM (FIGS. 5 and 6. Microcomputer $\mu$-COM forms a part of the control circuit of the record player embodying the present invention, and will be more fully described below. The loading end detection signal supplied to the microcomputer $\mu$-COM constitutes a signal for indicating that the record player should begin its music search operation.

A spindle motor 18 is mounted on chassis frame 7 and has a driving shaft terminating in center spindle 6 for rotating the turntable 3 at a constant speed dependent on the type of record played, for example 45 rpm or 33 rpm.

The mechanism for moving the tone arm 4 relative to the turntable base 5, and hence turntable 3, will now be described in connection with FIGS. 3 and 4. The tone arm 4 has, at its distal end, a pickup or cartridge 20 bearing a stylus 20a. Tone arm 4 is provided on a player board 19 forming the top wall of turntable base. A proximal end 4a of tone arm 4 is slidably supported on a guide rail 21 mounted on a rear end portion 19a of player board 19. Tone arm 4 may be moved linearly and horizontally across the turntable base 5, and is guided by guide rail 21 to move in a direction perpendicular to the horizontal direction of motion of the turntable base 5 as it moves between its loaded and unloaded positions, that is, in FIG. 3, tone arm 4 may be moved to the left or right of the drawing. The pickup or cartridge 20 bearing stylus 20a is moved with tone arm 4, so that the tone arm 4 is moved linearly between an arm rest position in which the tone arm 4 does not overlie the turntable 3 (see FIG. 2), and an innermost position with the stylus 20a overlying the innermost track or groove of a record 22 placed on turntable 3. FIG. 3 illustrates the tone arm 4 in an intermediate position.

In the preferred embodiment herein described, the tone arm is moved linearly across the record. However, it is contemplated that in other embodiments the tone arm 4 may move in a non-linear fashion, for example, angularly, with tone arm detection means appropriately compensated for this different motion. These embodiments are all within the scope of the present invention.

A tone arm driving motor 23 is mounted on the chassis frame 7 and drives tone arm 4. The elements of the driving system of tone arm 4 are illustrated in FIG. 3, and will now be described.

Tone arm driving motor 23 has a driving shaft 24 with a pulley 25 fixed at the distal end thereof. A horizontal shaft 26, mounted in parallel with guide rail 21, is rotatably mounted on chassis frame 7 and has a pulley 27 fixed at one end thereof. A belt 28 is operatively looped about pulley 25 and pulley 27. Shaft 26 bears a worm 29 which rotates therewith. Chassis frame 7 also rotatably supports a vertical shaft 30 upon which a drum 31 is rotatably mounted. A pulley 31A and a worm wheel 31B are integrally mounted on the upper and lower surfaces, respectively, of drum 31. Worm wheel 31B is engagingly meshed with worm 29.

A string 37 passes about pulley 31A of drum 31 and about a pair of pulleys 32 and 33 respectively disposed adjacent the two ends of guide rail 21. Guide rollers 34, 35 and 36 further guide the path of string 37, as illustrated in FIG. 3. An intermediate portion of the string 37 between pulleys 32 and 33 is attached to tone arm 4 by stop projections 38a and 38b formed at either side of the proximal end 4a of the tone arm 4. As string 37 is moved in the path indicated, tone arm 4 will be carried along therewith to move in its linear horizontal motion.

Upon forward or reverse rotation of the tone arm driving motor 23, pulley 25 is rotated, thereby causing pulley 27 and worm 29 to rotate. In turn, worm 29 rotates worm wheel 31b, driving string 37 in a forward or reverse direction along the indicated path, so that tone arm 4 is similarly moved linearly along guide rail 21 to either the left or right of FIG. 3. At the end of play of a record, tone arm 4 is moved to its rest position to the extreme right of the turntable base 5, as shown in FIGS. 1 and 2, in a lead out operation, so that when turntable base 5 is subsequently moved its unloaded position, a record may be easily placed upon turntable 3. Conversely, when play is begun, tone arm 4 is driven to the left of FIG. 3 to assume an intermediate position over the record 22.

A blank portion sensor 39 is arranged at the underside of the central portion of the upper wall of cabinet 1. Sensor 39 is positioned to overlie the path of motion of the center spindle 6 of turntable 3 as turntable base 5 is moved from its loaded to its unloaded position. This path is identified as line X in FIG. 3. Sensor 39 serves to detect the annular blank portions which lie in between the tracks bearing the recorded information, and may comprise a light emitting element 39a and a light receiving element 39b. During the loading operation of the turntable base 5, which will be described in greater detail below, light is emitted from the light emitting element 39a and is reflected by the surface of record 22 to be received by the light receiving element 39b. In the blank portions of the record, and at the outermost edge portion of the record outside of the first track of recorded information, grooves are sparsely formed, giving a relatively flat surface where the reflectivity is high. Therefore, the percentage of light reflected will be relatively high, so that the light receiving element 39b receives a relatively large amount of light. By producing an indication when it receives a relatively large amount of light, the sensor 39 may be used to detect the blank portions and the outermost edge portion. Light receiving element 39b of sensor 39 generates pulses upon the reception of a sufficient amount of light, so that it will generate pulses upon the detection of the blank portions or the outermost edge portion.

A reflecting marker 40, which may be made of a reflector such as aluminum film (FIGS. 1, 2 and 3), is adhered to the turntable base 5 at a fixed distance from the center spindle 6 along an extension of the path of motion of center spindle 6 as turntable 5 moves between its loaded and unloaded positions, that is, along line X. Marker 40 serves as a reference point fixed with respect to the turntable base for measuring the radial positions of the blank portions. During the loading operation with record 22 on turntable 3, the light receiving element 39b mounted on the cabinet 1 will sequentially detect the passage of marker 40, the outermost edge portion of the record, and the subsequent blank portions of the record, in the order listed. By means described below, these pulses are used to measure the radial positions of the edge portion and blank portions of this particular record, and data corresponding to these measured radial positions is subsequently used to control the leftward linear movement of tone arm 4 to position tone arm 4 properly to begin play at the start of a selected song.

A sensitivity changeover switch (not illustrated) for controlling the sensitivity of sensor 39 may be manually operated to insure that sensor 39 generates a proper number of pulses for the detection of the blank portions. Since the reflectivity of a particular record may vary over a range, this sensitivity changeover switch serves to adapt the sensor 39 so that it will properly detect the annular blank portions and will not produce a detection signal during the recorded track portions. Thus, the sensor 39 is adjustable to generate the proper number of pulses and prevent the pulse number from being larger or smaller than the predetermined number of pulses.

An arrangement according to this invention for coordinating the motion of the tone arm 4 and the motion of the turntable base 5 so that the tone arm may be moved to overlie a selected annular blank portion will now be described. As shown in FIG. 4, a rotary disk 42 has radial slits 41 spaced at equal angular intervals. Rotary disk 42 is mounted at one end of the shaft 11, which bears worm 12, rotated by driving motor 14 for horizontally reciprocating the turntable base 5 between its loaded and unloaded positions. A light emitting element 43 and a light receiving element 44 are mounted to oppose each other with rotary disk 42 therebetween. Together, rotary disk 42, light emitting element 43 and light receiving element 44 constitute a turntable position sensor 45 for detecting the position of turntable base 5 with respect to cabinet 1. When the driving motor 14 is turned on to move the turntable base 5 with respect to cabinet 1, rotary disk 42 is rotated with shaft 11, so that light emitted from the light emitting element 43 is intermittently received by the light receiving element 44 through the slits 41. From the light received, signal pulses are generated by the light receiving element 44. The number of pulses received by the light receiving element 44 is equal to the number of slits 41 passed by the light emitting element 43 for a particular displacement of the turntable base 5, so that the number of those pulses is proportional to the displacement.

Figure 4:
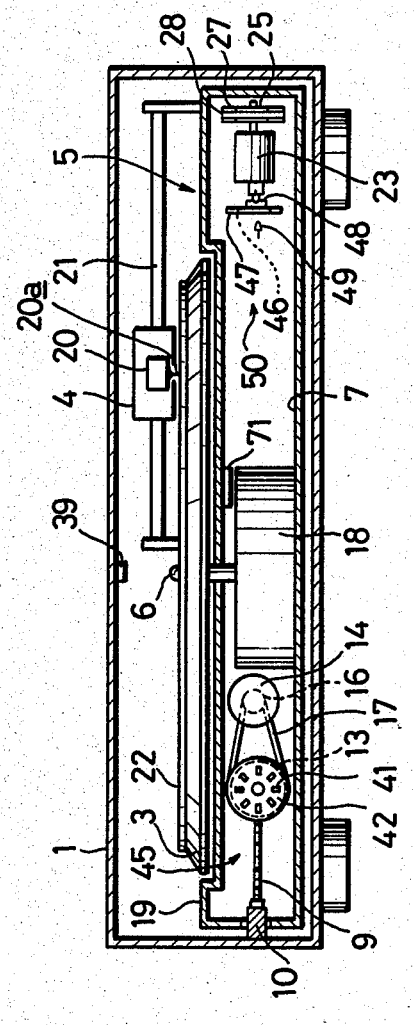
FIG. 4 is a transverse sectional view taken along the line IV—IV on FIG. 3.

Similarly, as shown in FIGS. 3 and 4, a rotary disk 47 having radial slits 46 spaced at equal angular intervals is mounted on one end of the horizontal shaft 26 bearing worm 29 and driven by tone arm driving motor 23. A light emitting element 48 and a light receiving element 49 are arranged to oppose each other with rotary disk 47 therebetween. Together, the rotary disk 47, the light emitting element 48 and the light receiving element 49 constitute a tone arm position sensor 50, which operates in a similar manner to turntable position sensor 45. When the tone arm driving motor 23 is turned on to move the tone arm 4, the tone arm position sensor 50 generates pulses in the same manner as described above with respect to turntable position sensor 45. As a result, the displacement of tone arm 4 can similarly be determined by counting the number of pulses from light receiving element 49, which will be proportional to this displacement.

Tone arm position sensor 50 and turntable position sensor 45 are desirably designed so that the displacement of turntable base 5 with respect to cabinet 1 (the displacement of record 22 placed on turntable 3) corresponding to a certain number of pulses generated by turntable position sensor 45, is equal to the displacement of tone arm 4 (stylus 20a) for the same number of pulses generated by the arm position sensor 50. This allows the data corresponding to the radial positions of the blank portions, as generated from the pulses from the turntable position sensor 45 as discussed below, to be used to control the position of the tone arm 4. When, in particular construction of a record player according to the present invention, the displacement of turntable base 5 upon 1 revolution of worm 12 associated with driving motor 14 differs from the displacement of tone arm 4 upon one revolution of worm 29 associated with the tone arm driving motor 23, the number of slits 41 of the rotary disk 42 may be adjusted relative to the number of slits 46 of the rotary disk 47, so that the displacement per pulse of the turntable base 5 is equal to the displacement per pulse of the tone arm 4. Because of this correspondence, the radial positions measured by sensor 39 during the motion of turntable base will correspond to the radial positions of tone arm 4 during its horizontal motion.

Figure 5:
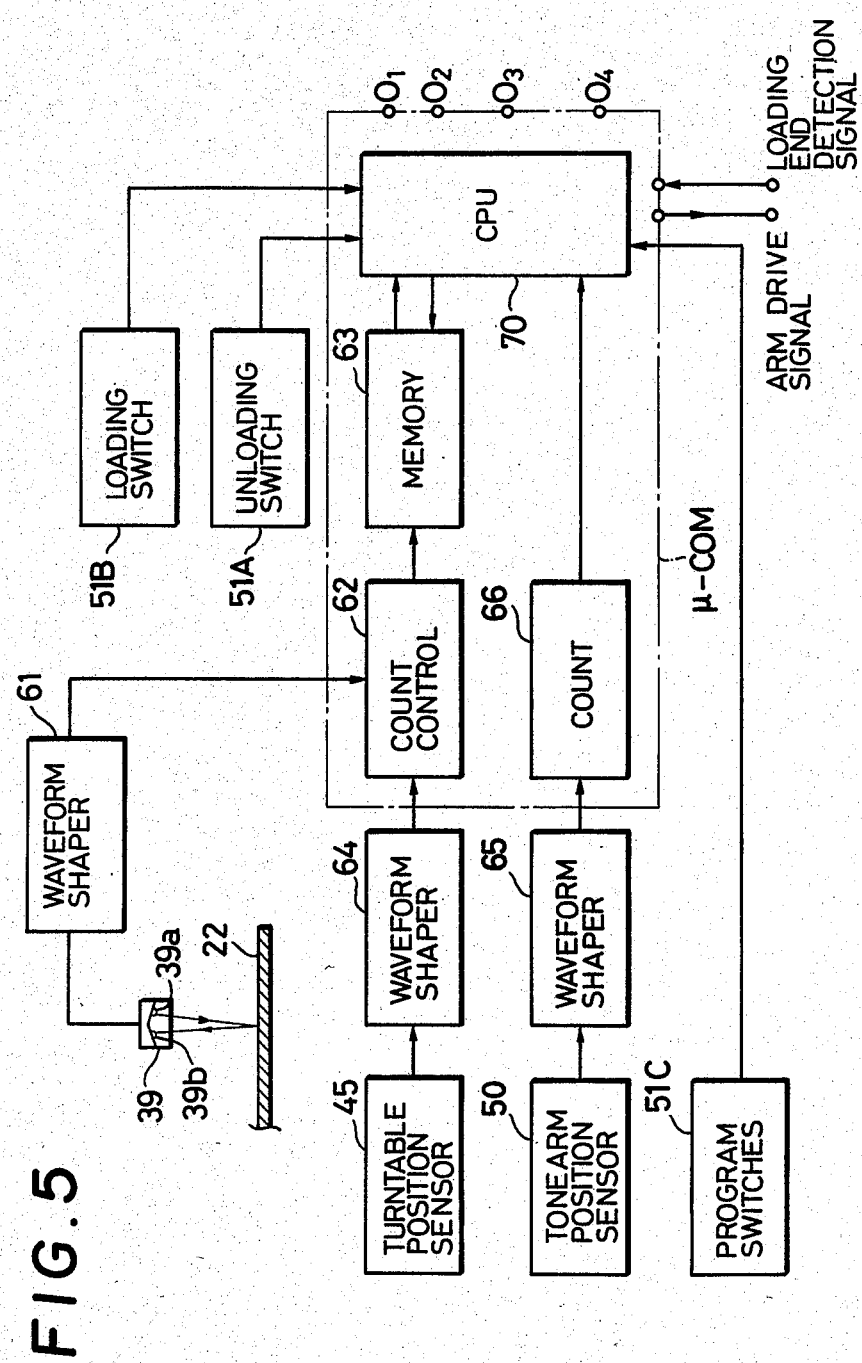
FIG. 5 is a block diagram of a control circuit of the record player embodying the present invention.

A control circuit operative to receive the pulses from turntable position sensor 45 and tone arm position sensor 50 and to control the actuation of the tone arm 4 so that it may be set down in the blank portion immediately in advance of a selected song is illustrated in FIG. 5 and will now be described.

Pulses generated by sensor 39 are supplied to a waveform shaper 61, wherein they are appropriately shaped, and from there are supplied as blank portion detection pulse signals to a count control 62 of microcomputer μ-COM. The level of the marker detection signal, which is the pulse generated from the sensor 39 in response to the detection of marker 40 may be quite high, since the reflectivity of marker 40 is also quite high. If this pulse were shaped in the same manner as the pulses created upon the detection of the edge or blank portions of the record 22, this marker detection signal would have an excessively wide pulse width, and the position of marker 40 would not be accurately detectable. In order to prevent this, waveform shaper 61 may be provided with circuitry (not illustrated) so that the threshold level of the marker detection pulse differs from that of the edge or blank portion detection pulses, in order that the pulse width of the marker detection signal may be narrowed. The pulse generated when the sensor 39 detects the marker 40 on the turntable base 5 is supplied to count control 62 of microcomputer μ-COM through waveform shaper 61 to reset the count of count control to 0. At this time, a value of 0 for radial distance is stored in a count memory 63 at address 0, so that radial distances are measured relative to this point.

The pulses generated from the turntable position sensor 45 as the turntable base 5 moves from its unloaded position to its loaded position are shaped by a waveform shaper 64 and are supplied as turntable position pulse signals to the count control 62 of microcomputer μ-COM. The count control 62 counts the number of pulses generated by the waveform shaper 64 and the counts, which constitute data corresponding to the radial distance of the outermost edge portion and annular blank portions, sequentially, are sequentially stored in the count memory 63 at identifiable addresses whenever the edge portion detection pulse or the blank portion detection pulses are received from sensor 39. When the turntable base 5 is completely loaded in cabinet 1 in its loaded position, the loading end detection switch, which may simply be a limit or microswitch actuated by base 5, is operated to supply a loading end detection signal to the microcomputer μ-COM. At this time, the count memory 63 contains data corresponding to the radial positions of the outermost edge portion and all the blank portions on the record 22 stored at identifiable addresses. Actuation of one of the program switches 51C provides a selection signal to a CPU 70, which defines one of these addresses as a music address, that is, the address in count memory 63 at which the data is stored corresponding to the radial position of the blank portion immediately preceding the selected song. The position of the tone arm 4 is controlled by this music address, as will now be described.

Microcomputer μ-COM generates an arm drive signal upon the receipt of the loading end detection signal from the loading end detection switch. The tone arm drive motor 14 is turned on to move the tone arm 4 from its rest position at the rightmost extreme of guide rail 21 toward the left to pass over the record 22. The pulses generated by the arm position sensor 50 are supplied to a waveform shaper 65, which can supply the shaped pulses as an arm position signal to a counter 66 forming part of microcomputer μ-COM. When the tone arm 4 has reached a predetermined position with respect to a reference point, that is when it has reached a position corresponding to the position of marker 40, waveform shaper 65 begins to supply the arm position signal to counter 66, which begins counting the pulses to create a counted tone arm signal. The counted tone arm signal is compared in CPU 70 with the count stored in count memory 63 at the music address. When there is a coincidence between the counted tone arm signal and the count stored at the music address, CPU 70 generates a plurality of outputs and supplies them to a tone arm actuating control circuit. A drive signal, hereinafter referred to as the normal kick signal for permitting or effecting downward movement of the tone arm 4 to place the stylus on the record 22, and a hold signal for maintaining the tone arm 4 at this lower position, are generated from output terminals $O_3$ and $O_2$, respectively, of microcomputer μ-COM. These terminals, along with terminals $O_1$ and $O_4$ of microcomputer μ-COM are connected to the tone arm actuating control circuit, illustrated in FIG. 6, which controls the movements of the tone arm by a conventional actuator (not shown) such that the stylus 20a will always be set down in the blank portion immediately preceding the selected song even when the record is eccentric or fits loosely about the spindle 6. This tone arm actuating control circuit will now be described with reference to FIG. 6.

Spindle motor 18, previously described in connection with FIG. 4, has 8 pole magnets 18a to 18h spaced at equal angular intervals of 45° around of the spindle 6 on the rotor of spindle motor 18, as schematically illustrated in FIG. 3. A Hall element or sensor 71 is mounted on either cabinet 1 or turntable base 5 at a predetermined position to oppose the rotor of the spindle motor 18. This predetermined position is advantageously a position along the blank portion detection line, line X in FIG. 3. A detection output from Hall sensor 71 (FIG. 6) is supplied to and amplified by an amplifier 72, and the amplified signal is then shaped by a waveform shaper 73. The output from waveform shaper 73 is supplied as a clock signal to an octal shift register 74. The shift register 74 produces outputs Q1 to Q8, only one of which is active at any given time. In the present description, it will be assumed that positive logic is used, so that an output is active when it is at logic "1" or at a high voltage level. Of course, a corresponding construction using negative logic or active-low components may be readily implemented by those skilled in the art, and is within the scope of the present invention.

Every time the clock pulse is supplied to shift register 74, the contents of shift register 74 are shifted such that the order of the active terminal is increased by one. A switch 75 is operable to select one of outputs Q5, Q6 and Q7 according to the speed of play of record 22. Switch 75 selects the output terminal Q6 when a 33 rpm long playing record is played. Switch 75 is used to compensate for the different amounts of rotation per unit time of these different playing speeds, as the degree of rotation is detected in the present invention and used to control the position of set down of the stylus 20a.

A flip-flop 76 has its rest terminal $R_{76}$ connected to output terminal Q3 of shift register 74. Set terminal $S_{76}$ of flip-flop 76 is connected through a resistor 77 and switch 75 to the selected one of the outputs Q5 to Q7 of shift register 74. In the operation described with respect to FIG. 6, it is assumed that a 33 rpm long playing record is being played, and thus switch 75 is connected to output Q6. Set terminal $S_{76}$ of flip-flop 76 is also connected to an output terminal $O_2$ of the microcomputer $\mu$-COM through a diode 78. The output terminal $Q_{76}$ of flip-flop 76 is connected to a set terminal $S_{80}$ of a flip-flop 80 through a diode 79. The output terminal $Q_{80}$ of flip-flop 80 is connected to set terminal $S_{76}$ of flip-flop 76 through a diode 81. Reset terminal $R_{80}$ of flip-flop 80 is connected to the output terminal $O_2$ of microcomputer $\mu$-COM through an inverter 82. Reset terminal $R_{83}$ of a flip-flop 83 is connected to the output of inverter 82 through a resistor 84 and a capacitor 85 in series. Resistor 84 and capacitor 85 constitute a differentiating circuit. Set output terminal 86 of flip-flop 83 is connected to output terminal $O_3$ of microcomputer $\mu$-COM through a diode 87. Output terminal $O_3$ is also connected to an output terminal OUT through a diode 88. Output $Q_{76}$ of flip-flop 76 is connected to the output terminal OUT through a resistor 89 and a diode 90. Set terminal $S_{83}$ of flip-flop 83 is connected to output terminal $O_4$ of microcomputer $\mu$-COM. Reset output terminal 91 of flip-flop 83 is connected through a diode 92 to a common node of resistor 89 and diode 90.

The terminal OUT selectively provides the kick signal for actuating the tone arm to move stylus 20a down onto record 22, or the tone arm hold signal by which the tone arm is maintained in its lowered position.

More particularly, flip-flop 76 generates an automatic kick signal when flip-flop 76 is set, for actuating the tone arm to move downward to place the 20a in contact with the record. The purpose of flip-flop 80 is to set flip-flop 76 in response to a high output from output Q6 of shift register 74 occurring only after the generation of a hold signal H from output terminal $O_2$ of microcomputer $\mu$-COM. This hold signal H is a high output at the output terminal $O_2$. Flip-flop 80 also serves to prevent the setting of flip-flop 76 except when output Q6 first goes high after hold signal H goes high.

The purpose of flip-flop 83 is to cause the output terminal OUT to provide the normal kick signal produced by microcomputer $\mu$-COM at output $O_3$ in place of the automatic kick signal generated by the setting of flip-flop 76 when the tone arm 4 is to be moved downwardly in response to the manual depression of an up-down control key, rather than being moved down automatically in response to the selection of a particular song. This up-down key (not illustrated) thus constitutes a manual override of the operation of the automatic music search, or alternatively, constitutes a substitute therefor.

As stated previously, shift register 74 is reset such that output Q1 is made active and the remaining outputs Q2 through Q8 are made inactive in response to the generation of the loading end signal from output terminal $O_1$ of microcomputer ----COM.

Figure 6:
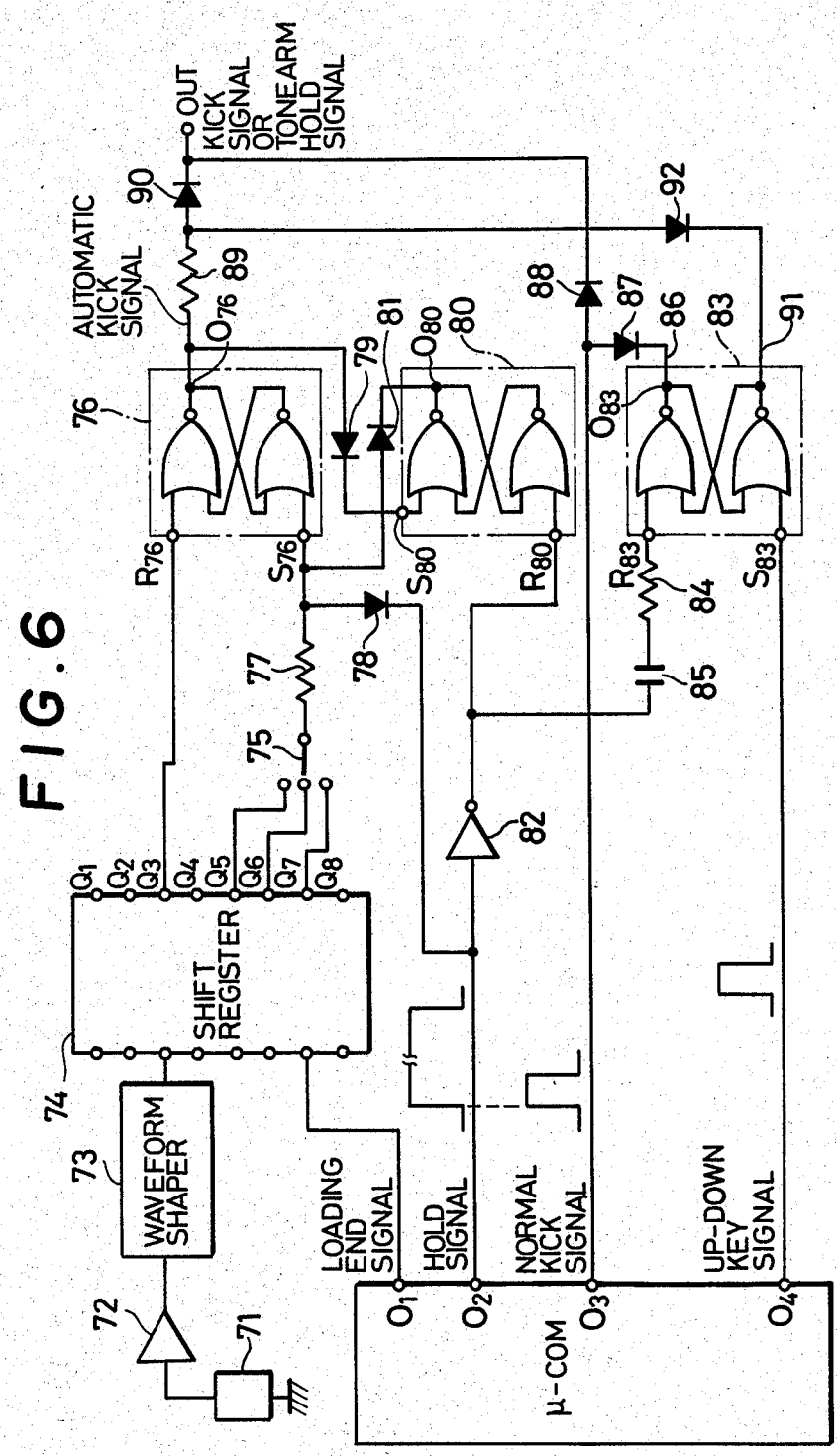
FIG. 6 is a circuit diagram of a tone arm actuating control circuit of the record player embodying the present invention.

The operation of the record player embodying the present invention in performing an automatic music search will now be described in detail with reference to FIGS. 5 and 6.

To begin operation of the record player, the unloadng switch 51A is actuated, causing the turntable base 5 to move outwardly from cabinet 1 into its unloaded position, as shown in FIG. 2. The user places a desired record 22 on the turntable 3, with the hole at the center of the record engaging the spindle 6. Of course, since the size of the hole in the center of the record may vary, the record 22 may fit loosely on the spindle 6, thereby permitting eccentricity of the center of record 22 in respect to the number of rotations of turntable 3 and the automatic music search of the present invention is designed to compensate for such eccentricity.

The user also specifies a desired song number by operating program switches 51C. At this time, the up-down key is not actuated, so that the operation is automatic. Then loading switch 51B is actuated, so that driving motor 14 is turned on to return the turntable base 5 into the cabient 1 to its loaded position. During this loading operation, the sensor 39 first detects the marker 40 and supplies a pulse to waveform shaper 61. A shaped pulse from waveform shaper 61 is then supplied to count control 62 which is reset to 0. Data of 0 is stored in the count memory 63 at address 0. Subsequently, as the turntable base 5 continues to move into the cabinet 1, sensor 39 sequentially detects the outermost edge of record 22 and the following blank portions lying between adjacent recorded portion or songs. The corresponding pulse signals are sequentially generated by waveform shaper 61, and this pulse array is supplied to the count control 62.

Also during the loading operation of the turntable base 5 into the cabinet 1, while the driving motor 14 is on, pulses are generated from the turntable position sensor 45 and are supplied to and shaped by waveform shaper 64. These shaped pulses are sequentially counted by count control 62, and these counts, which constitute data corresponding to the radial positions, are sequentially stored in the count memory 63 at identifiable addresses in accordance with the pulses generated from waveform shaper 61. That is, the counts corresponding to particular turntable positions, which in turn correspond to radial positions of the blank portions and the outermost edge portion, are stored in count memory 63 at identifiable addresses whenever pulses from waveform shaper 61 indicate the detection of these blank portions and edge portion, so that a count corresponding to the radial position for the outermost edge portion and each of the blank portions may later be read from count memory 63.

When the turntable base 5 has been completely loaded into its loaded position and the loading end detection switch is activated, the loading end detection signal is provided to micrcomputer $\mu$-COM, which in turn generates the arm drive signal to drive the tone arm 4. This arm drive signal operates to turn on tone arm driving motor 23, so that tone arm 4 is moved horizontally along guide rail 21.

As the same time, the loading end signal is supplied from output $O_1$ of microcomputer $\mu$-COM to reset register 74 such that output Q1 is set at "1" and Q2 through Q8 are set at "0". Therefore, a signal of "1" from output Q1 indicates that the angular position of the detecting line X along which the blank portions had been detected is at an initial reference angular position. As the spindle motor 18 rotates, the pole magnets 18a through 18h sequentially pass by Hall sensor 71, so that clock pulses are generated in waveform shaper 73 and supplied to shift register 74. Each complete rotation of the spindle motor 18 causes 8 clock pulses to be generated, corresponding to the 8 pole magnets. Thus, as the spindle motor 18 completes one rotation, the logic level "1" of the outputs Q1 through Q8 is shifted in the order of Q1, Q2, Q3, Q4, Q5, Q6, Q7, Q8, Q1, Q2, . . . in response to the received clock pulses from waveform shaper 73. The relative angular position of the detection line X along which the blank portions were detected by sensor 39 corresponds to the particular output terminal Q1 to Q8 which is active at any particular time. Therefore, shift register 74 constitutes storage means containing angular position information while turntable 3 is rotated. Shift register 74 begins storing this information from the moment the turntable 3 begins rotation, so that at any subsequent time the relative angular position of the detection line may be known.

As the tone arm 4 moves horizontally across the record 22, arm position sensor 50 generates pulses, which are shaped by the waveform shaper 65 and counted from a predetermined position corresponding to the reference point. This count, which is a counted tone arm signal, is compared by CPU 70 with the count stored at the music address, corresponding to the radial position of the blank portion immediately preceding the song specified by the program switches 51c. When a conicidence between the counted tone arm signal and the count stored at the music address is detected within CPU 70, the tone arm driving motor 23 is turned off by an output generated from CPU 70. At this time also, the normal kick signal and the hold signal are generated from output terminals $O_3$ and $O_2$ of microcomputer $\mu$-COM, respectively. However, it has been assumed that the up-down key has not been actuated, and therefore the set terminal $S_{83}$ of flip-flop 83 receives a signal at the "L" or "0" level. Since $O_2$ generates the hold signal, which is high, the output of inverter 82 is low, and this produces a low signal at the reset terminal $R_{83}$ of flip-flop 83. Output terminal 86 of flip-flop 83 is also at a low level. Therefore, diode 87 is forward biased and diode 88 is reverse biased, so that the normal kick signal appearing at output $O_3$ of microcomputer $\mu$-COM is suppressed and does not appear at the output terminal OUT through the diode 88.

Meanwhile, while the tone arm 4 is being moved horizontally, the spindle motor 18 is rotating. Assume that one of the eight pole magnets 18a through 18h of spindle motor 18 exactly opposes Hall sensor 71 at the time spindle motor 18 starts rotating. As the spindle motor 18 rotates, the magnets sequentially pass by Hall sensor 71, and the logic level "1" at the outputs Q1 to Q8 of storage register 74 is cyclicly shifted in the manner described above. The hold signal H is generated from output $O_2$ of microcomputer $\mu$-COM when the tone arm is at the correct radial position, as described above. When output Q6 of shift register 74 next goes high (logic "1") after the hold signal H appears at the output terminal $O_2$, a pulse of logic "1" is supplied to the set terminal $S_{76}$ to set flip-flop 76. The automatic kick signal is generated from output $Q_{76}$ to actuate the tone arm to move downward, so that the pickup device 20a of tone arm 4 is correctly landed on the desired blank portion of the record 22.

When flip-flop 76 is set, the automatic kick signal at the output $Q_{76}$ also sets flip-flop 80. The reset output of flip-flop 80 is connected through diode 81 to the set input $S_{76}$ of flip-flop 76. When flip-flop 80 is set, this reset output is low, so that diode 81 is forward biased. Therefore, any subsequent pulses of logic "1" from output Q6 while flip-flop 80 is set will be suppressed and will not appear at the set terminal $S_{76}$ of flip-flop 76. Until flip-flop 80 is reset, flip-flop 76 cannot be set again. In other words, flip-flop 76 can be set in response to a high output from output Q6 after the hold signal H for tone arm 4 is generated. Flip-flop 80 is only reset when this hold signal stops, that is when output $O_2$ is returned to a low level. However, when output $O_2$ of microcomputer $\mu$-COM is at a low level, diode 76 will be forward biased, and once again the set terminal $S_{76}$ will be forceably held at the low level. Even if a pulse of level "1" appears from output terminal Q6 of shift register 74 under these circumstances, flip-flop 76 will not be set. The purpose of this circuit arrangement to arrange that the automatic kick signal will only be generated once in response to the detection of the selected annular blank portion.

After flip-flop 76 has been set, the shift register 74 continues to shift with the rotation of the spindle motor 18. When the output of order $Q_n+a$ (the order obtained by shifting a times after the signal of logic "1" has appeared at output terminal $Q_n$), in this case, when the output terminal Q3 is set at logic 1, flip-flop 76 is reset. The automatic kick signal is no longer generated from flip-flop 76. At this point, the pickup device 20a of tone arm 4 has been landed on the record. Due to the particular selection of outputs Q6 and Q3, as will next be discussed, the pickup device 20a is landed at the same angular position on record 22 as the detection line X along which the blank portions were detected by sensor 39. Since the pickup device is landed at the same radial distance as detected by sensor 39 and at the same angular position as detected by sensor 71, it will be landed exactly at the beginning of the desired song. In this manner, the automatic music search can be accurately performed even when the record is eccentric.

The drive signals for actuating the tone arm 4 to move it down, for example by means of a plunger, and to hold it at its lowered position are the kick signal, which is either the automatic kick signal for automatic operation or the normal kick signal for manual operation, and the tone arm hold signal, respectively. The kick signal is a high voltage applied from terminal OUT to move the tone arm 4 downward. After the pickup device 20a of the tone arm 4 is lowered into contact with the record 22, the low voltage from terminal OUT, which constitutes the tone arm hold signal, is applied to hold the tone arm in its lowered position. The kick signal appears at terminal OUT during the time interval during which the signal of level "1" is shifted from output Q6 to output Q3 of the shift register 74. That is, shifting is performed five times. Therefore, the time interval is ⅝ths of the time required for one rotation of the turntable 3.

As is apparent from the description above of the preferred embodiment, in order to land the pickup device of the tone arm 4 at the angular position of reocrd 22 corresponding to the detection line X along which the radial positions were detected by sensor 39 during loading, the angular distance through which the record 22 rotates during the time of downward movement of the tone arm 4 is subtracted from the angular position at which the pickup device 20a of the tone arm 4 should land. This new angular position can be specified on the basis of the information describing the degree of rotation of the record 22 held in shift register 74. When the detection line X has reached this angular position, the pickup device 20a of tone arm 4 is begun to be moved downward. Therefore, the landing position of the pickup device 20a coincides with the angular position at which the blank portion detection was performed.

The relative angular position of the line of detection X has been stored in register 74 while the record 22 rotated and is determined by the order of the output terminal at which the signal of logic "1" appears. The eight pole magnets 18a to 18h of spindle motor 18 and the octal shift register 74 require that the record 22 makes one revolution while the signal of logic "1" completes one cycle through the order of outputs Q1 to Q8. Therefore, when the horizontal movement of tone arm 4 is stopped above the beginning position of the desired song of record 22 upon the coincidence of the music address and the tone arm position address, the tone arm 4 starts to move down in response to the automatic kick signal only when the output terminal Q6 of shift register 74 is set at logic "1". In the described operation, Q6 is the output terminal which corresponds to the angular position of line X minus the angular distance for moving the tone arm 4 completely down.

When the output Q3 of shift register 74 is next set at logic "1" after the appearance of the automatic kick signal, flip-flop 76 is reset, so that the automatic kick signal is no longer generated. Since the time interval required for the downward movement of the tone arm 4 and the rpm of the spindle motor 18, and hence the turntable 3, are known, output terminals Q6 and Q3 have been selected to give an interval between the set and reset signals of flip-flop 76 such that the pickup device 20a of the tone arm 4 is moved downward to land at the beginning of the song following the detected blank portion.

When it is desired to play a record at a different rpm, for instance when a 45 rpm record is to be played, the rpm of the spindle motor 18 is changed. Then the time interval required for one revolution of the turntable 3 also changes. In this case, switch 75 illustrated in FIG. 6 is switched from output terminal Q6 to output terminal Q5 to once again equate the time interval for shifting from Q5 to Q3 with the time interval required for downward movement of the tone arm 4.

Manual actuation to move the tone arm 4 downward at the beginning position of a song will now be described. For this mode of operation, the user depresses the up-down key (not illustrated) on cabinet 1, to create the up-down key signal, shown in FIG. 6, from output terminal O4. Flip-flop 83 is set in response to the key signal, and therefore output terminal 91 is at the low level. Diode 92 is forward biased, and any automatic kick signal appearing as an output from flip-flop 76 will not appear at the output terminal OUT. Instead, the normal kick signal appears at the output terminal OUT through forward biased diode 88. The lowering and holding of tone arm 4 in its lower position is therefore controlled by the normal kick signal and the hold signal from microcomputer μ-COM.

In the embodiment discussed above, the pole magnets of the spindle motor 18 were detected by Hall sensor 71. However, angular position detecting means according to the present invention is not limited to the above described arrangement. For example, a drum such as turntable 3 which is rotated in sychronism with the spindle motor 18 may be provided with magnets similarly disposed at equal angular intervals for detection by the Hall sensor 71. Other alternative methods of detecting angular position are possible and are considered to be within the scope of the present invention.

In the embodiment discussed above, Hall sensor 71 just opposes one of the pole magnets 18a through 18h of spindle motor 18 at the start of rotation of the turntable 3. However, a deviation may occur when the Hall sensor 71 does not exactly oppose one of the pole magnets at the start of rotation, but rather is offset slightly, giving a time deviation no greater than ⅛th the time for one rotation. Any deviation between the blank portion detection line X on the record 22 and the position at which the pick up device 20a is landed will fall with the range of ⅛th of a rotation of the turntable 3. Therefore, even if the record 22 is eccentric or is loosely fitted around the center spindle 6, the error falls within this range and the accuracy of landing will be sufficient to prevent any practical inconvenience. In addition, if the number of poles of the spindle motor 18 is increased to a number n greater than 8, and an n base shift register 74 is used, the above described deviation will be even further decreased to at most 1/nth rotation.

Furthermore, while the preferred embodiment has been described to have blank portion detection means (sensor 39), it is also possible that the recorded portions may be detected instead, or positional data corresponding to the beginnings of these recorded portions be used for controlling the motion of the tone arm. These and similar variations may be readily understood by those skilled in the art, and come within the scope of the invention.

Therefore, according to this invention, radial detecting means provides radial data to control the movement of the tone arm over the record to the radial position of a detected blank portion, and the angular position detecting means enables the pickup device of the tone arm to be moved downward to contact the record at the blank portion detecting line, so that an automatic music search while the record is rotating may be performed. Therefore, the tone arm actuating device of the present invention compensates for the case when the record is eccentric or is loosely fitted around the center spindle by consistently moving the tone arm to the radial and angular position of the beginning of the desired song.

While a single preferred embodiment is being described hereinabove, many modifications and variations thereof will become apparent to those of ordinary skill in the art, and reference should made to the appended claims for a complete understanding of the scope and spirit of the present invention.

I claim:

1. A record player of the type including a rotatable turntable, a tone arm carrying a pickup device for playing a record disk resting on said turntable and which has a plurality of radially spaced annular portions with information recorded thereon and intervening annular blank portions, and a tone arm actuating device to perform an automatic search function and to set down said pickup device on the record disk while it is rotating with said turntable, said record player further comprising:
   first detecting means for detecting radial positions of said portions of a record disk resting on said turntable along a radial detection line at a predetermined initial angular position of said turntable;
   second detecting means for detecting, as said record disk rotates, the angular positions of said detection line relative to said initial angular position; and
   control means for controlling operation of said tone arm actuating device in response to the detected radial and angular positions such that said pickup device is set down on the one of said blank portions immediately in advance of a selected one of said recorded portions of the record disk at an angular position on the record disk substantially corresponding to said detection line.

2. A record player according to claim 1, wherein said first detecting means is opeative to detect said radial positions while said record disk is not rotating.

3. A record player according to claim 1, wherein said second detecting means includes storage means for storing angular position data corresponding to said detected angular positions.

4. A record player according to claim 3, wherein said second detecting means includes
   a pluality n of detectable elements equally angularly spaced in a circle concentric with said turntable and rotating therewith;
   a detection element fixedly located with respect to said intial angular position for producing a detection signal in response to the passage of each said detectable element past said detection element; and
   means for supplying said detection signals to said storage means.

5. A record player according to claim 4, wherein said storage means has n ordered outputs corresponding to said n detectable elements, respectively, only one of said outputs is active at any one time, the order of the active output at a particular time corresponds to the relative angular displacement of said detection line from said initial position, and a first of said outputs is connected to said control means.

6. A record player according to claim 5, further comprising
   first means for generating radial position data corresponding to said detected radial positions;
   memory means for storing said radial position data at identifiable addresses therein;
   second means for generating a tone arm position signal corresponding to the radial position of said pickup device in respect to the record disk;
   comparison means for detecting a coincidence of said tone arm position signal and the radial position data sotred in said memory means corresponding to the radial position of said blank portion immediately in advance of said selected recorded portion; and
   said control means includes enabling means for enabling said tone arm actuating device upon the detection of said coincidence.

7. A record player according to claim 5, wherein a second of said outputs is connected to said control means, and wherein the time interval between the time when said first output is active and the next successive time when said second output is active corresponds to the time required for setting down said pickup device onto said record disk.

8. A record player according to claim 7, wherein said n detectable elements define n angular sections of said turntable, one of said sections contains said detection line, and said first output is selected so that the time interval between the time when said coincidence is detected and the time when said second output is active permits sufficient rotation of said record disk so that said pickup device is set down on said record disk within said one section containing said detection line.

9. A record player according to claim 4, wherein n equals 8.

10. A record player according to claim 1, wherein said control means controls the time of set down of said pickup device on said record disk.

11. A record player according to claim 10, further comprising tone arm position detecting means, and said control means controls said time of set down relative to the time at which said pickup device is at a radial position corresponding to the detected position of the blank portion immediately in advance of said selected recorded portion.

* * * * *